United States Patent [19]
Berg et al.

[11] 3,929,707
[45] Dec. 30, 1975

[54] PROCESS FOR THE PRODUCTION OF POURABLE, PULVERULENT RUBBER-FILLER MIXTURES

[75] Inventors: Gerhard Berg; Karl-Heinz Nordsiek, both of Marl, Germany

[73] Assignee: Chemische Werke Huels Aktiengesellschaft, Marl, Germany

[22] Filed: June 27, 1974

[21] Appl. No.: 483,709

[30] Foreign Application Priority Data
June 28, 1973   Germany............................ 2332796

[52] U.S. Cl........ 260/29.7 T; 252/525; 260/29.7 G; 260/29.7 EM; 260/29.7 PT; 260/29.7 N; 260/33.6 AQ; 260/34.2; 260/42.55; 260/42.57; 260/584 B
[51] Int. Cl.$^2$..... C08J 3/20; C08K 5/01; C08L 9/04
[58] Field of Search 260/29.7 T, 29.7 GP, 29.7 EM, 260/29.7 PT, 29.7 N, 34.2, 33.6 AQ, 42.55, 42.57, 584 B; 252/525

[56] References Cited
UNITED STATES PATENTS

| | | | |
|---|---|---|---|
| 2,979,528 | 4/1961 | Lundsted.......................... | 260/584 B |
| 3,706,676 | 12/1972 | Franke et al...................... | 260/584 B |
| 3,846,365 | 11/1974 | Berg et al....................... | 260/33.6 AQ |

OTHER PUBLICATIONS
Shigeyoshi – Chem. Abs. 77, 21883v (1972).

Katsura et al. – Chem. Abs. 77, 75778h (1972).

*Primary Examiner*—Melvyn I. Marquis
*Assistant Examiner*—H. H. Fletcher
*Attorney, Agent, or Firm*—Millen, Raptes & White

[57] ABSTRACT

In a process for preparing discrete, finely divided, tack-free, pourable, powdery, filler-containing elastomer particles from an admixture of (a) an aqueous elastomer emulsion comprising (i) a solution of elastomer dissolved in a volatile, inert organic solvent having a boiling point below 100°C, (ii) an elastomer emulsifying amount of an alkylamine oxyalkylate surfactant, and (iii) water; and (b) an aqueous suspension or dispersion of a solid, finely divided elastomer filler, which comprises gradually introducing said admixture into an aqueous alkali silicate solution containing 2–20 moles of $SiO_2$ per mole of said alkylamine oxyalkylate while maintaining said silicate solution at an acidic pH of 0.1–7 and simultaneously evaporating said volatile organic solvent to form said filler-containing elastomer particles, the improvement which comprises:

employing said admixture of (a) and (b) in the form of a stable, aqueous emulsion containing an emulsion-stabilizing amount of an ionic, water soluble protective colloid and having an alkaline pH of 7–14.

22 Claims, No Drawings

PROCESS FOR THE PRODUCTION OF POURABLE, PULVERULENT RUBBER-FILLER MIXTURES

BACKGROUND OF THE INVENTION

This invention relates to the preparation of discrete, pourable, finely divided, tack-free, filler-containing elastomer particles. More particularly, this invention relates to a simplified process for preparing such optionally plasticized elastomer particles from stable, storable mixtures prepared with the aid of ionic protective colloids and the use of such mixtures in the elastomer precipitation step.

The processing of thermosetting elastomers into shaped objects is normally a multistage procedure. In contrast to the manufacture of molded components from thermoplastic synthetic resins, it is absolutely necessary, prior to the final shaping step, to conduct a generally complicated mixing process to obtain homogeneous incorporation of diverse additives prior to the cross-linking reaction. The high viscosity of the raw materials and their handling in bale form makes it necessary to utilize heavy machines, e.g., rolling mills or internal mixers, which perforce require a high energy consumption. The inherent considerable costs of such energy and equipment greatly impair the economy of the production of elastomeric materials.

Therefore, many efforts are now being directed toward adapting rubber technology to the principles of thermoplastic processing. An ideal starting point to attain this objective is rubbers in pulverulent form. Starting with the advantageous possibilities afforded in transportation and storage, the provision of automated feeding and conveying devices promises considerable savings in the feeding of mixing-and-deformation units. In order to incorporate additional ingredients, powder mixing plants can be utilized, which operate under very much more economical conditions. Thus, a continuous processing technique employing a high degree of automation has moved into the realm of possibility for the rubber industry.

In order to put the above-described ideas into practice, several methods which appeared suitable for the production of corresponding pulverulent rubber substances have been developed. Thus, German Pat. application No. P 22 14 121.5 and corresponding U.S. Pat. application Ser. No. 343,433 filed Mar. 21, 1973, now U.S. Pat. No. 3,895,035, the contents of which are incorporated by reference herein, describe a process according to which discrete, finely divided pourable, tack-free, filler-containing elastomers are prepared by emulsifying rubber solutions, optionally containing mineral oil plasticizers, in water in the presence of alkylamine oxyalkylates, introducing suspensions of solid fillers, preferably carbon blacks, optionally containing emulsifiers into these emulsions; effecting precipitation by continuously introducing the filler-containing, aqueous emulsions of the rubber solutions into a hot aqueous alkali silicate solution wherein the pH during the entire precipitation step ranges between 0.1 and 7, preferably between 1.0 and 3.5; simultaneously and continuously distilling off the rubber solvent; separating the thus-obtained, finely divided filler-containing rubber mixture from the water; and drying the product to form pourable, filler-containing elastomer particles. The process can be applied to solid elastomers or to post-polymerization elastomer solutions, and is particularly suitable for preparing pourable carbon black-containing elastomer particles to be directly formed into shaped objects by molding, extrusion, etc.

Another process for preparing pourable, filler-containing elastomer particles is described in German Patent application No. P 22 60 340.3 and corresponding U.S. patent application Ser. No. 421,819 filed Dec. 5, 1973, the contents of which are also incorporated by reference herein, wherein an admixture of a rubber solution and filler is flash-evaporated. As with the above and other processes, pourable, filler-containing elastomer particles amenable to thermoplastic processing techniques are obtained.

A particularly interesting modification of such process is described in German Patent application No. P 23 24 009.7 and corresponding U.S. patent application Ser. No. 468,669 filed May 10, 1974, the contents of which are likewise incorporated by reference herein, wherein a plasticizing oil is adsorbed onto carbon black fillers and the resultant particles, which exhibit rheological properties characteristic of the carbon black alone, are employed as the source of both filler and plasticizer oil in the preparation of pourable, filler and plasticizer-containing elastomer particles.

Especially valuable elastomers for use in such processes are homopolymers and the stereo block homopolymers of butadiene prepared according to the adiabatic polymerization process with lithium catalysts according to the techniques of U.S. patent application Ser. No. 378,010 filed July 10, 1973 and Ser. No. 309,817 filed Nov. 27, 1972, now U.S. Pat. No. 3,829,409, the contents of which are also incorporated by reference herein.

The primary objective of these processes is to obtain pourable pulverulent rubber-filler mixtures wherein the customary homogenization of rubbers with fillers during the course of the processing operation is entirely eliminated. The processing method was preferably a three-stage process. Thus, in the first stage, an approximately 10% concentration rubber solution optionally containing plasticizer oil was emulsified in water in the presence of special emulsifiers, preferably alkylamine alkoxylates. In a second stage, dispersions or emulsions of fillers, optionally containing a plasticizer oil, are prepared, if desired in the presence of emulsifiers, preferably, alkylamine alkoxylates. In a third stage, both aqueous disperse systems were mixed together and finally processed into pourable, pulverulent rubber-filler mixtures by a precipitation process.

Inherent in these modes of operation are the relatively large amounts of water passing from the first two stages into the mixing stage, thus burdening the processing operation. These modes of operation lead perforce to relatively low solids contents, whereby the economy of the processes is impaired. Finally, only a small proportion of the water obtained during the processing step, as compared to the total quantity, could be recycled into the processes.

The elastomer solutions amenable to such processing can be produced by conventional solution polymerization techniques under constant, preferably ambient pressure and within a narrow temperature range, e.g., using Ziegler catalysts or lithium catalysts and suitable solvents such as pentane, hexane, heptane, etc., thus obtaining dissolved solids contents of 6–12%. Such solutions can immediately be processed to emulsions in the proposed manner while in the phase, obtained during the polymerization. Preferred elastomers are EPM (ethylene-propylene monomers) and EPDM (ethylenepropylenediene monomers), lithium homopolymers of butadiene, as well as lithium copolymers of butadiene and styrene having vinyl group proportions of 8–60%.

In accordance with a particularly advantageous procedure, those elastomers are utilized which have been obtained by adiabatic polymerization of butadiene in the presence of a lithium-based catalyst system of a organolithium compound, on the one hand, and Lewis bases, on the other hand, and which consist of polybutadiene with vinyl group proportions of between 25 and 60% described in the aforementioned U. S. Patent.

The polybutadiene solutions obtained by adiabatic polymerization typically have disclosed solids contents of 5 to 25%, wherein the solution viscosities are greater than 40, typically 150 – 20.000 and can reach b 40,000 cp., measured at 25° C as a solution in the polymerization solvent, preferably hexane. Such solutions cannot be processed to stable aqueous emulsions under the emulsifying conditons heretofore known and/or proposed. Therefore, a dilution stage had to follow the polymerization, wherein by the introduction of the organic solvent the viscosity and solids content were both reduced. The values most favorable for the precipitation processes range around 10% solids content and viscosities of 200 – 500 cp. Consequently, there has been an urgent need for economical processing reasons to be able to process highly viscous solutions of a high solids content, such as are obtained during the adiabatic homo- and copolymerization of butadiene in the presence of lithium, directly in the consistency evolved during the polymerization.

A further problem consists in that mixtures of the aqueous emulsion of the rubber solution and of the aqueous dispersion of the fillers, which under normal conditions are stable, storable, and low viscosity fluids, exhibit strongly diminished stability periods in case of certain rubber, filler, and plasticizer oil combinations, e.g., when using special dispersions of carbon blacks containing plasticizer oil adsorbed thereon. Such periods often amount to merely one minute. The reduction in stability manifest itself in creaming which begins immediately after the mixing of the disperse systems. The viscosity increases greatly at the same time, leading to difficulties in metering and conveying. In especially unfavorable instances, the disperse systems break up following the creaming process, and the rubber solution separates. Such broken-up systems are unsuitable for economical further processing into pulverulent rubber mixtures. It is of course possible to forestall the reduction in stability by carefully selecting very short times between the mixing and precipitation steps such that these times are below the critical time at which the system breaks up. However, the mere fact that metastable systems can occur is highly unsatisfactory from the viewpoints of operation and production technology.

OBJECTS OF THE INVENTION

Accordingly, it is a general object of this invention to provide a process for circumventing the aforementioned disadvantages in a maximally simple and economical manner.

Another object of this invention is to provide stable, storable mixtures suitable for the preparation of pourable, pulverulent, optionally plasticized rubber-filler mixtures.

A further object of this invention is to provide a process for preparing discrete, finely divided, pourable, and tack-free filler-containing elastomer particles optionally containing mineral oil plasticizer which greatly reduces the volumes of water which are processed.

An additional object of this invention is to provide an improved process for preparing discrete, finely divided, tack-free and pourable elastomer particles containing a filler and mineral oil plasticizer from initially highly concentrated and/or viscous elastomer solutions.

Other objects and advantages of this invention will become apparent to those skilled in the art upon further study of the specification and appended claims.

SUMMARY OF THE INVENTION

Briefly, the above and other objects are attained in one aspect of this invention by providing, in a process for preparing discrete, finely divided, tack-free, pourable, powdery, filler-containing elastomer particles from an admixture of (a) an aqueous elastomer emulsion comprising (i) a solution of elastomer dissolved in a volatile, inert organic solvent having a boiling point below 100°C, (ii) an elastomer emulsifying amount of an alkylamine oxyalkylate surfactant, and (iii) water; and (b) an aqueous suspension or dispersion of a solid, finely divided elastomer filler, which comprises gradually introducing said admixture into an aqueous alkali silicate solution containing 2–30 moles of $SiO_2$ per mole of said alkylamine oxyalkylate while maintaining said silicate solution at an acidic pH of 0.1–7 and simultaneously evaporating said volatile organic solvent to form said filler-containing elastomer particles, the improvement which comprises employing said admixture of (a) and (b) in the form of a stable, aqueous emulsion containing an emulsion-stabilizing amount of an ionic, water soluble protective colloid and having an alkaline pH of 7–14.

DETAILED DISCUSSION

It has now been found possible to obtain stable, storable preparations useful in preparing pourable, pulverulent rubber-filler mixtures optionally containing plasticizer oil by combining certain protective colloids with aqueous emulsions of rubber solutions. The resultant stable, storable preparations optionally further contain an aqueous filler suspension or emulsion, and can be precipitated and dried to form powdery, pourable filler-containing elastomer particles. The stable, storable preparations are obtained if an ionic, high-molecular weight, water-soluble colloid, preferably a high-molecular sodium polyacrylate, is added to the water containing emulsifiers before, during or after the admixing of the rubber solution which optionally contains plasticizer oil, with the water and emulsifiers, and setting the pH of the thus-obtained mixture to 7–14, preferably 10–13. The amount of the protective colloid utilized can be between 1% and 10% by weight, based on the amount of emulsifier. Surprisingly, the same effects cannot be obtained when using either the emulsifying agent or the protective colloid alone.

In this way, it is now possible in a maximally simple procedure to process highly viscous rubber solutions containing high amounts of solids, e.g., which are obtained in the adiabatic polymerization of butadiene in the presence of lithium-based catalysts, with water directly to stable, aqueous emulsions, and to combine these emulsions with aqueous filler dispersions to form stable, storable mixtures. The stability of these mixtures surprisingly becomes independent of the mixture components, such as rubber, filler plasticizer oil. Furthermore, it becomes possible thereby to simultaneously eliminate the above-described deficiencies in a surprisingly simple manner. Thus, it is not only possible by means of the present process to convert rubber solutions having dissolved solids contents of 12–26% and solution viscosities of 40–40,000 cp. into aqueous emulsions, but also to stabilize the mixtures of these emulsions with aqueous filler dispersions so that an intermediate storage over a longer period of time becomes unproblematic. This fact is of great significance if an immediate further processing of the mixtures is impossible, due to disturbances in the precipitation stage otherwise encountered.

Suitable as emulsifiers within the scope of the process of this invention are alkylamine oxyalkylates of the general formula

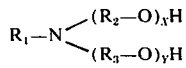

wherein $R_1$ is alkyl or alkenyl groups of 1–20 carbon atoms, preferably 12–18 carbon atoms, $R_2$ and $R_3$ are each ethylene or propylene groups, and X and Y are each integers of between 1 and 80, preferably between 6 and 20.

Suitable such compounds are well known in the art and include but are not limited to lauryl-, myristyl-, cetyl-, stearyl-, and oleylamine oxyethylates, as well as the corresponding oxypropylates, e.g., laurylamine oxypropylate. The alkylamine oxyalkylate emulsifiers are utilized in amounts of 0.05 – 2.0% by weight, preferably 0.2 – 1.0% by weight, based on the weight of the elastomer solution.

The protective colloids employed in the present invention are ionic, water soluble in the amounts employed, and have a high molecular weight characteristic of their colloidal properties. Such colloids preferably comprise alkali metal or ammonium salts of an anionic polymeric material such as a polyacrylate.

Preferred ionic, high-molecular weight colloids are water-soluble alkali metal, preferably sodium polyacrylates having number average molecular weights of 100,000 –2,000,000, preferable 250,000 – 1,500,000.

The high-molecular sodium polyacrylate is preferably used as a 1% aqueous solution in quantities of 0.001 – 0.5% by weight, preferably 0.005 – 0.1% by weight, based on the weight of the elastomer solution. the sodium polyacrylate solution is preferably added to the water prior to the dispersion step, especially if elastomer solutions having viscosities of more than 5,000 cp. are to be processed.

In a special embodiment of the present process, the high-molecular weight sodium polyacrylate is added to the emulsion of elastomer solution and water after the elastomer emulsification step but before combining the elastomer emulsion with a carbon black dispersion. This can be effected in cases where the viscosity and solids content of the elastomer solutions are sufficiently low to result in stable emulsions with the emulsifier-containing water, without requiring further stabilization with high-molecular weight solution polycarylate. Such stabilized emulsions also lead, when admixed with the protective colloid carbon black dispersion, to very stable mixtures of long shelf life.

Suitable for the present process are many known elastomers which are soluble in organic solvents, such as polybutadiene with a specific 1,2-content, polyalkenamers, EPM or EPDM types, and solution-polymerized copolymers of butadiene and styrene. Advantageously, polymers can be utilized which cover a very broad range with respect to their molecular weights. Products having a solution viscosity ( $\eta$ ) of between 1.0 dl./g. and 10 dl./g. (e.g., as measured at 25°C as a 10% solution in 1,2,4-trichlorobenzene) can be utilized without difficulties. The elastomer solutions are manufactured in a conventional manner by solution polymerization, e.g., in the presence of Ziegler catalysts or lithium catalysts, employing conventional volatile solvents such as pentane, hexane, heptane, etc.

Preferred are those polymers which have been produced in an aliphatic solvent and can be used immediately in the form obtained during the polymerization, after an appropriate working-up step. Especially suitable within the scope of the claimed process are elastomers obtained by the polymerization of butadiene or by the copolymerization of butadiene and styrene in the presence of lithium catalysts. This polymerization is conducted in a conventional manner, e.g., as described in U.S. Pat. No. 2,975,160, DAS 1,300,239, and DOS 1,495,655. The thus-obtained polymers have vinyl group proportions of 8–60%.

According to a particularly advantageous embodiment of the present process, those elastomers are employed which have been obtained by the adiabatic polymerization of butadiene in the presence of a catalyst system from organolithium compounds, on the one hand, and Lewis bases, on the other hand, and which exhibit polybutadiene vinyl group proportions of between 25% and 50%. In addition to homopolybutadienes, preferred are copolymers consisting of butadiene and at most 60% by weight of styrene wherein 8–30% of the butadiene is bound in the 1,2-position. The copolymerization is likewise conducted preferably adiabatically. In this method, block copolymers are employed which consist of butadiene and at most 60% of styrene and wherein the polybutadiene contained therein has vinyl group proportions of 8–30%. Also suitable for this purpose are random copolymers produced analogously to homopolymers, consisting of butadiene and at most 40% by weight of styrene and wherein the butadiene is bound in the 1,2-position to an extent of 8–30%.

In place of the elastomer solutions obtained by the polymerization of butadiene and/or butadiene-styrene mixtures in the presence of lithium catalysts, it is also possible to use elastomer solutions obtained by the redissolution of suitable, finished polymers. Thus, emulsion and suspension polymerization products are amenable to processing provided they are soluble in a volatile solvent.

Preferred fillers within the scope of the process of this invention are the carbon blacks customary in the rubber industry, wherein carbon blacks of all activity stages can be utilized. Suitable carbon blacks include but are not limited to SAF (super abrasion furnace), ISAF (intermediate super abrasion furnace), HAF (high abrasion furnace), FEF (fast extruding furnace), and MT (medium thermal) carbon blacks. In place of or in addition thereto, light-colored fillers can also be used, e.g., highly active silicic acid, kaolin, ground slate, etc. The amount of carbon black to be employed is 1–500% by weight, preferably 40–150% by weight, based on the solid elastomer. The amount of silicic acid to be employed is 1–400% by weight, preferably between 25 and 150% by weight, based on the solid elastomer. Combinations of carbon black with light-colored fillers, preferably silicic acid, are also possible. All fillers are mixed as emulsifier-free, aqueous suspensions or emulsifier-containing aqueous dispersions with the aqueous emulsion of the rubber solution, for example by simple agitation at pH values of between 7 and 14, preferably 10 and 13. The emulsifiers employed in the preparation of the emulsifier-containing aqueous dispersions are preferably the same alkylamine oxyalkylates used during the production of the emulsions from rubber solutions and water.

Suitable plasticizer oils are the refinery products usually employed for this purpose, consisting, depending on the purpose of application, preferably of aromatic, naphthenic, and/or paraffinic hydrocarbons. The amount of plasticizer oils to be utilized generally ranges between 1% and 100% by weight, preferably between 30% and 60% by weight, based on the elastomer.

According to the present process, it is not only possible to introduce into the emulsion fillers, such as carbon black or silicic acid in optimum dispersion and in almost any desired amounts, but also all auxiliary agents required for the vulcanization, e.g., antiaging substances, zinc oxide, stearic acid, sulfur and vulcanization accelerators. The mineral oil plasticizers can be incorporated into the rubber mixtures according to the process of this invention in several different ways. For example, the plasticizer oil is stirred into the rubber solution prior to the production of the stable emulsion of water, high-molecular sodium polyacrylate, and emulsifier. Alternatively, the plasticizer oil can be applied, e.g., in a "Henschel" mixer, to the surface of the active filler, especially an active carbon black. The oil-laden filler powder is introduced into the process during the preparation of the slurry or dispersion of water, emulsifier and filler. In this connection, while a dispersion along the lines of the present process is stabilized by auxiliary emulsifying agents, a slurry which does not contain any auxiliary emulsifying agents, such as emulsifiers, is unstable and is segregated upon standing more or less quickly into solid and liquid phase.

The process of this invention takes its course by using various measures as explained hereinbelow. In a first stage, an elastomer solution optionally containing plasticizer oil, the viscosity of which can be 40 – 40,000 cp. and the solids content of which can be 5 – 25%, is emulsified in water at temperatures of between 5° and 200°C, preferably between 15° and 100°C, this water containing, in addition to the emulsifier and sodium hydroxide to adjust the pH, an emulsion stabilizing amount of an ionic, high-molecular, water-soluble colloid, preferably a high-molecular weight sodium polacrylate. In a second stage, a solid filler which optionally contains plasticizer oil is made into a slurry with water or dispersed in water in the presence of a wetting agent. The disperse systems of the two stages are combined in a third stage to stable and storable mixtures. Before processing, it is possible, if desired, to introduce into these mixtures all solid auxiliary agents required for the vulcanization, e.g., antiaging substances, zinc oxide, stearic acid, sulfur and vulcanization accelerators. The aqueous disperse phase obtained in this way, which contains all auxiliary agents, is continuously fed into hot water which, if desired, is combined with an alkali silicate solution, the pH of this water ranging between 0.1 and 7. preferably between 1.0 and 3.5.

The precipitating step and the removal of the solvent by distillation take place in one operating step, suitably under cooling and under pressures ranging below, at or above atmospheric pressure, wherein the temperatures are selected so that they are above the azeotropic boiling point of the rubber solvent and water at the pressure employed.

In this procedure, the elastomer filler mixture, which optionally contains plasticizer oils, is obtained in an inordinately fine-particulate, non-tacky form. This elastomer mixture obtained in the finely divided form after precipitation and after removal of the solvent is freed of the main amount of water by filtration or decanting in accordance with conventional methods, e.g. on screens, rotary-cell filters, suction filters or centrifuges, and dried according to known processes, e.g. in belt dryers, drum dryers, fluidized-bed or spray drying plants, plate dryers, etc. preferably under constant motion. The thus-obtained elastomer filler mixture is pourable and pulverulent.

The pourable, pulverulent elastomer filler mixtures containing plasticizer oil, as obtained according to the process of this invention, especially rubber-carbon black mixtures, are of great practical significance in the production of molded rubber articles of a great variety of types by the direct feeding of the pulverulent elastomer mixtures containing plasticizer oil in extruders, on calenders, and in automatic transfer molding and injection molding machines.

If certain auxiliary substances are to be added to these pulverulent mixtures in the rubber processor's plant, this admixture is possible with the use of maximally simple agitator systems, e.g. the "Loedige", "Papenmeier", or "Henschel" mixers. The pulverulent rubber mixtures optionally containing various fillers and/or additives can now be utilized in a surprisingly simple and economical manner directly in the final stage of the customary rubber processing operation, i.e., in the molding process, eliminating the heretofore required heavy mechanical devices for the various mixing steps. Quite particular advantages are obtained by using the plasticizer-containing, pulverulent rubber-filler mixtures in the manufacture of tire treads. The powdery mixtures of this invention offer favorable conditions, in this connection, for the use of automated conveying, metering, and mixing devices, making it possible to convert discontinuously operating large-scale plants to a continuous mode of operation with reduced initial investment, energy, and personnel costs.

The claimed process will be explained in greater detail with reference to the following examples.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

An agitator-equipped autoclave having a capacity of 280 l. is filled, under careful exclusion of air and moisture, with 110 kg. of hexane, 32.5 kg. of butadiene and 65 g. of ethylene glycol dimethyl ether. The reaction solution is heated to 71°C and then combined with 10.8 g. of n-butyllithium. The autoclave is neither heated nor cooled, during polymerization, so that an adiabatic reaction takes place. The polymerization is terminated after 5 minutes, at which point pressure and temperature have risen to 15.5 atmospheres gauge and 179°C, respectively. The conversion is 100%, based on the monomer. The solution contains 22.8% by weight of solid polybutadiene. 162.5 g. of di-tert.-butyl-p-cresol is then added to the hot rubber solution which is under pressure, and the solution is then cooled to 20°C. The solution viscosity is 34,000 cp. The polybutadiene exhibits the following analytical data:

| Mooney viscosity (ML-4) | 72 |
| Gel content | 3.1 % |
| trans-1,4- content | 40 % |
| cis-1,4- content | 25 % |
| vinyl (1,2-) content | 35 % |

100 kg. of a thus-obtained polybutadiene solution is emulsified in 100 kg. of water with the aid of "Supraton" emulsifying device in the presence of 42.8 g. of a high-molecular weight sodium polyacrylate (trade name PLEX 5367 F) and 600 g. of laurylamine oxyethylate (X + Y = 12 in the general formula). The pH during the emulsification step is between 11 and 12.

The pH of the stable, aqueous emulsion is set to 12.0 by the addition of sodium hydroxide solution. This emulsion is combined under agitation with 190.2 kg. of an aqueous slurry of 19.38 kg. of ISAF carbon black (trade name Corax 6). After 12 hours of storage, the thus-obtained dispersion mixture is stirred into an aqueous precipitant bath consisting of a mixture, heated to 90° – 95°C, of 50 kg water, 13.5 kg. of 10% sulfuric acid and 400 g. of a 26% aqueous sodium silicate solution. The pH in the precipitant bath is between 1.8 and 2.3. The hexane solvent is simultaneously removed by distillation, and the rubber mixture is precipitated in an extremely fine particulate form. The particle sizes range between 10 and 1000 $\mu$. After the hexane has been completely exhausted, the precipitated product is vacuum-filtered, washed with water, and dried under vacuum at 75°C, thus obtaining a pourable, pulverulent rubber-carbon black mixture.

EXAMPLE 2 a. a 280-liter agitated autoclave is filled, under careful exclusion of air and moisture, with 104 g. of hexane, 22.88 kg. of butadiene, 3.12 kg. of styrene and 26 g. of ethylene glycol dimethyl ether. The reaction solution is heated to 74°C and then combined with 9.9 g. of n-butyllithium to initiate polymerization. The autoclave is neither heated nor cooled during polymerization, whereby an adiabatic reaction is effected. After 6 minutes, the conversion is 100%. The temperature of the solution is 154°C and the pressure is 10.3 atmospheres gauge. The hot rubber solution under pressure is combined with 130 g. of di-tert.-butyl-p-cresol, and the solution is then cooled to 20°C. The content of solid butadiene-styrene copolymer in the solution is 20% by weight. The viscosity is 22,000 cp. The thus-obtained butadiene-styrene copolymer has the following analytical data:

| Styrene content | 12 % |
| Butadiene content | 88 % |
| Mooney viscosity (ML-4) | 76 % |
| Gel content | 2 % |

Steric arrangement of the butadiene units:

| trans-1,4- content | 36 % |
| cis-1,4- content | 28 % |
| Vinyl (1,2-) content | 24 % |
| Block styrene content | 3.2 % | b. A stable aqueous emulsion is obtained when 135 kg. of a polymer solution produced according to (a) is emulsified in 124 kg. of water with the aid of "Supraton" emulsifying device in the presence of 31.2 g. of a high-molecular weight sodium polyacrylate (trade name PLEX 5367 F) and 810 g. of laurylamine oxyethylate. (X + Y = 12 in the general formula). During the emulsifying process, the pH is adjusted to 12.2 by adding 500 ml. of 10% sodium hydroxide solution in order to maximize the stability of the emulsion.

c. A carbon black containing plasticizer oil adsorbed thereon is obtained as follows: A "Henschel" mixer having a capacity of 30 liters is filled, at a wall temperature of 20° – 50°C, with 3 kg. of HAF black (trade name Corax 9). After the rotor has been started up at a speed of 1,600 r.p.m., 1.76 kg. of plasticizer oil, previously heated to 60 – 80°C, with a high aromatic content (trade name NAFTOLEN MV) is introduced by spraying in finely divided form within 3 minutes through an inlet port provided with fine bores. After the oil feed has been terminated, the rotor is allowed to run for another 2 minutes to complete the distribution. After a total mixing time of 5 minutes, the carbon black-plasticizer oil mixture is present in the dust-fine distribution characteristic of carbon black, without impairment of the pourability and without any caking tendency.

d. 4.05 kg. of this carbon black-plasticizer oil mixture is dispersed in 46.2 l. of water with the aid of an "Ultra-Turrax" emulsifying device in the presence of 76.5 g. of laurylamine oxyethylate (total X + Y = 12 in the general formula).

e. This carbon black-plasticizer oil dispersion is mixed with 60 kg. of the stable aqueous emulsion of the rubber solution prepared in accordance with (b), thus obtaining a stable mixture. The latter is stored for 16 hours under continuous agitation.

f. The mixture produced according to (e) is pumped, after a storage period of 16 hours, into a mixture, heated to 95°C, of 60 kg. of water, 5.12 kg. of 10% sulfuric acid and 344 g. of 26% sodium solution. The rubber mixture precipitates in finely divided form while the hexane rubber solvent is simultaneously distilled off. After separation from water, subsequent washing with water and drying under vacuum at 75°C, a pourable, pulverulent rubber-carbon black mixture containing plasticizer oil is obtained.

EXAMPLE 3

(Comparative Example)

Following the procedure of Example 1 but without the addition of sodium polyacrylate, 100 kg. of the polybutadiene solution is homogenized for 30 minutes in "Supraton" emulsifying device with 75 kg. of water containing 600 g. of laurylamine oxyethylate (total X + Y = 12 in the general formula). During the emulsification step, the pH is set to 12.0 by the addition of sodium hydroxide solution analgously to Example 2(b). After the emulsifying device has been turned off, the pseudo-emulsion breaks down and separates into separate phases of rubber solution and water. A stable emulsion is not obtained.

EXAMPLE 4

(Comparative Example)

The solution of a butadiene-styrene copolymer produced according to Example 2 is subjected to an emulsifying step, as described in Example 2(b), but without the addition of sodium polyacrylate. No stable emulsion is produced. After the emulsifying device is turned off, the system breaks down and separates into separate phases of rubber solutions and water.

EXAMPLE 5 a. 30 kg. of a 10% solution of polybutadiene, obtained by solution polymerization of butadiene with the aid of butyllithium as the catalyst in hexane and having a vinyl group content of 35% and a Mooney viscosity of 93, is emulsified in 29.82 l. of water with the aid of "Supraton" emulsifying device in the presence of 180 g. of laurylamine oxyethlate, (total $X + Y = 12$ in the general formula).

The pH is set to 11.5 during the emulsifying step with 10% sodium hydroxide solution. The resultant stable emulsion is combined under agitation with 600 g. of a 1% aqueous solution of high-molecular weight sodium polyacrylate (trade name PLEX 5367 F).

b. With the aid of an "Ultra-Turrax" 4.05 kg. of a carbon black plasticizer oil mixture prepared according to Example 2(c) is dispersed in 16.2 l. of water in the presence of 121.5 g. of laurylamine oxyethylate. The thus-obtained dispersion of the carbon black-plasticizer oil mixture is combined with 60 kg. of an aqueous emulsion of the rubber solution obtained according to Example 5(a).

c. By combining the aqueous dispersions prepared in accordance with Examples 5(a) and 5(b), a stable, homogeneous mixture is obtained which is storable under agitation.

d. The mixture prepared according to the above Example 5(c), stabilized by high-molecular weight sodium polyacrylate (trade name PLEX 5367 F) is pumped into an aqueous precipitant bath heated to 95°C, consisting of a mixture of 50 kg. of water, 243 g. of 26% sodium silicate aqueous solution and 102 g. of 10% sulfuric acid. The rubber mixture is precipitated in finely divided form while the hexane is evaporated. After separation from water and dyring, a pourable, pulverulent rubber-carbon black mixture containing plasticizer oil is obtained.

EXAMPLE 6

(Comparative Example)

When the emulsion of polybutadiene solution and water prepared according to Example 5(a) is not stabilized with sodium polyacrylate before combining with the carbon black dispersion produced according to Example 5(b), the mixture of the polyacrylate-free emulsion and the dispersion of the carbon black-plasticizer oil mixture is unstable. After only one minute, a thickening process sets in, the mixture becomes creamlike and the rubber solution separates.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. What is claimed is:

1. In a process for preparing discrete, finely divided, tack-free, pourable, powdery, filler-containing elastomer particles from an admixture of (a) an aqueous elastomer emulsion comprising (i) a solution of elastomer dissolved in a volatile, inert organic solvent having a boiling point below 100°C, (ii) an elastomer emulsifying amount of about 0.05–2.0% by weight, based on the elastomer solution, of an alkylamine oxyalkylate surfactant, and (iii) water; and (b) an aqueous suspension or dispersion of a solid, finely divided elastomer filler, which comprises gradually introducing said admixture into an aqueous alkali silicate solution containing 2–20 moles of $SiO_2$ per mole of said alkylamine oxyalkylate while maintaining said silicate solution at an acidic pH of 0.1–7 and simultaneously evaporating said volatile organic solvent to form said filler-containing elastomer particles, the improvement which comprises:

employing said admixture of (a) and (b) in the form of a stable aqueous emulsion containing an emulsion-stabilizing amount of about 0.001–0.5% by weight, based on the elastomer solution, of an ionic, water soluble protective colloid, said stable emulsion having an alkaline pH of 7–14.

2. A process according to claim 1, wherein said stable aqueous emulsion has a pH of 10–13.

3. A process according to claim 1, wherein the protective colloid is present in component (a) of the admixture.

4. A process according to claim 1, wherein the ionic protective colloid is an alkali metal polyacrylate having a molecular weight of 100,000 to 2,000,000.

5. A process according to claim 3, wherein the protective colloid is a sodium polyacrylate having a molecular weight of 200,000 to 1,500,000.

6. A process according to claim 5, wherein the protective colloid is used in amounts of between 0.005 and 0.1% by weight, based on the elastomer solution.

7. A process according to claim 1, wherein the elastomer solution (i) has a solution viscosity of 40–40,000 centipoises at 25°C.

8. A process according to claim 6, wherein said elastomer solution has a dissolved elastomer content of 5 to 25% by weight.

9. A process according to claim 1, wherein the elastomer is a polybutadiene having a vinyl group content of 8–60% by lithium-based catalyst polymerization.

10. A process according to claim 9, wherein the polybutadiene is obtained by adiabatic polymerization and has a vinyl group content of 25–60%.

11. A process according to claim 1, wherein the elastomer is a copolymer of butadiene with up to 60% by weight of styrene produced in the presence of a lithium based polymerization catalyst, wherein 8–30% of the butadiene is bound in the 1,2-position.

12. A process according to claim 11, wherein the copolymer is one obtained by adiabatic polymerization of butadiene and styrene.

13. A process according to claim 12, wherein the elastomer is a block copolymer of butadiene with up to 60% by weight of styrene.

14. A process according to claim 11, wherein the elastomer is a random copolymer of butadiene with up to 40% by weight of styrene.

15. A process according to claim 1, wherein the elastomer is an EPM or EPDM copolymer.

16. A process according to claim 1, wherein the stable aqueous emulsion further comprises vulcanization ingredients.

17. A process according to claim 1, wherein the aqueous stable emulsion further comprises a mineral oil plasticizer.

18. A process according to claim 17, wherein the mineral oil plasticizer is adsorbed onto carbon black particles.

19. A process according to claim 1, wherein the alkylamine oxyalkylate is at least one compound of the formula

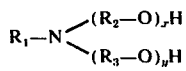

wherein $R_1$ is alkyl or alkenyl of 12–18 atoms; $R_2$ and $R_3$ are each divalent ethylene or propylene; and x and y are each integers of 6–20.

20. A stable aqueous elastomer emulsion composition having a pH of 10–13 and consisting essentially of
   a. 5–25% by weight of an elastomer having a viscosity of 40–40,000 centipoises selected from the group consisting of EPM, EPDM and butadiene elastomers dissolved in a volatile inert solvent having a boiling point below 100°C;
   b. 0.05–2.0% by weight, based on the elastomer solution, of an alkylamine oxyalkylate surfactant; and
   c. 0.001–0.5% by weight, based on the elastomer solution, of a water-soluble sodium polyacrylate protective colloid having molecular weight of 200,000 – 1,500,000.

21. A composition according to claim 20, further comprising a carbon black filler.

22. A composition according to claim 21, further comprising a mineral oil plasticizer.

* * * * *